May 25, 1937. A. M. HENRY Re. 20,379

AIRPLANE

Original Filed July 30, 1932 7 Sheets-Sheet 1

Inventor:

Augustus M. Henry

May 25, 1937. A. M. HENRY Re. 20,379

AIRPLANE

Original Filed July 30, 1932 7 Sheets-Sheet 2

Inventor:

Augustus M. Henry

May 25, 1937. A. M. HENRY Re. 20,379

AIRPLANE

Original Filed July 30, 1932 7 Sheets-Sheet 3

Inventor:
Augustus M. Henry

AIRPLANE

Original Filed July 30, 1932 7 Sheets-Sheet 4

Inventor:

Augustus M. Henry

AIRPLANE

Original Filed July 30, 1932 7 Sheets-Sheet 5

Inventor:

Augustus M. Henry

AIRPLANE

Original Filed July 30, 1932 7 Sheets-Sheet 6

INVENTOR

Augustus M. Henry

May 25, 1937. A. M. HENRY Re. 20,379

AIRPLANE

Original Filed July 30, 1932 7 Sheets-Sheet 7

INVENTOR
Augustus M. Henry

Reissued May 25, 1937 Re. 20,379

UNITED STATES PATENT OFFICE 20,379

AIRPLANE

Augustus M. Henry, Brooklyn, N. Y., assignor of thirty per cent to Frank J. Kent, Montclair, N. J.

Original No. 2,010,817, dated August 13, 1935, Serial No. 626,405, July 30, 1932. Application for reissue September 19, 1936, Serial No. 101,548

29 Claims. (Cl. 244—106)

This invention relates to airplanes; and aims, broadly, to provide a novel and improved airplane particularly advantageous for trans-Atlantic or other flights along air-lines overlying waters of considerable size.

The invention has been made with the idea of providing an airplane such that employment thereof will quickly create universal public conviction that the transport of valuable cargoes and large numbers of passengers by a heavier-than-air trans-oceanic flying machine is as safe as, or safer than, such transport by ocean liner, instead of requiring the height of human daring as heretofore; thereby not only to hasten the advent of trans-oceanic air transportation, but also immediately to remove from the public mind the present notion that such transportation, either for persons or valuable cargo, may never become a reality.

It is well known that attempts by airplane to bridge the gaps between land termini separated by many miles of ocean or sea, as in flying from one continent to another, have heretofore required an almost reckless type of courage on the part of the pilot (and on the part of the lone or several passengers, when there were such). And it is common knowledge that those who have dared and failed have been lamentably numerous as compared to the few who have dared and succeeded. The majority of the flights attempted have cost valuable lives, have destroyed valuable property, and above all have had the psychological effect of adversely affecting the popularization of aviation, and to a very serious extent.

The main object of the present invention is that not unambitious one stated in the second preceding paragraph. How that object is actually attained by the invention will be hereinafter clearly set forth. But in order fully to appreciate the importance of that object, and clearly to understand why certain expedients for the attainment of that object are herein disclosed and emphasized, some of the previously prevailing notions as to how a trans-oceanic airplane should be designed for maximum safety (which notions to my mind have stood in the way of the establishment of safe trans-oceanic flight as an ordinary every-day occurrence) require discussion, as follows:

An airplane designer, engaged on the problem of producing a passenger or even a freight airplane for a line of flight to be long sustained over water, as, say, to make a trip from central Europe to the United States, has heretofore been confronted with two alternatives, in the nature of a real dilemma, as a selection of either of such alternatives necessarily sacrificed important if not vital advantages that could only be secured by the adoption of the other of these alternatives.

(I) As to the first alternative: If the fuselage of the airplane be built as a boat-hull, that is, if a so-called seaplane be provided, alighting of the airplane at the end of a scheduled trip could not be effected on land fields or so-called air-ports. This, to my mind, is not the most serious objection;—for one reason, because, with the advance in the art to the point where today it is practicable to incorporate stream-lined shielding structures for projectant parts, and with the present-day knowledge of just what sudden and heavy air-pressure stresses must be withstood while an airplane is in flight, and with the present day knowledge of just what surfaces or contours are parasitic or are of aerodynamic assistance or are neutral as between the two factors last named, and with the present-day knowledge of the strengths of materials employed in airplane fabrication, permanently projectant, or safely projectible but normally retracted, landing gear of the type including wheels, are feasible of incorporation,—for another reason, because, in view of the fact that an airplane equipped with certain of the features of the present invention hereinbelow fully disclosed, and, particularly, an airplane also equipped with certain features of United States patent to me, No. 1,825,792 (keeping in mind the probable adoption at some comparatively early date in the future, if not very soon, of Diesel engines or other engines not employing such a dangerously inflammable fuel as gasoline), injury to life can fairly adequately be insured against even though the airplane, designed to alight normally on water, is in an emergency compelled to alight on land or on ice,—and, for still another reason, because practically the transoceanic termini are bodies of water on which the airplane will normally alight. However, a very serious objection to a transoceanic airplane equipped with a boat-hull type of fuselage, or with any type of fuselage carrying suspended pontoon-floats, to my mind seems to rest upon the considerations immediately following. As an absolute premise, the watchword from now on in aviation necessarily must be safety, safety, SAFETY—ahead of and beyond every other consideration, in view of the psychological factor above referred to. In other words, if—before air liners have safely made several hundred trips, with some of them ill-fated in the sense that every life on board has a number of times been placed at risk due to serious damage to the airplane from battling the elements at their worst, yet with no life in any of these last-mentioned cases ever having been lost,—an airplane is lost at sea, or some of the passengers and crew are injured or killed, transoceanic air flight will be set back a decade or more. When a score or more of passengers are lost in the foundering of a surface steamship, or in a railroad collision on land, people do not therefore stop traveling on surface ships or in railroad trains—this for the simple reason that a fatality of this kind is deemed merely an accident to be expected in any ordinary pursuit of life, and not a special attribute of a special mode of travel, and now one generally thought to be extremely if not foolhardily hazardous when attempted to be used for transoceanic flight by airplane.

These things being so, the lack of perfect safety of a boat-hull type of fuselage or of any type of fuselage carrying suspended pontoon-floats, is the paramount consideration—at the present point in the advance of aviation. The reason why hull structures or hull appendages of the kind last described, even such a boat-hull, for instance, as is employed in the DO-X, cannot be approved, are these: First, the dead-weight thereof. Second, the fact that such a hull, being of rigid, massive construction, presents unyielding, substantially flat walls of considerable area to take without freedom for recoil the tremendous pounding of heavy seas; as contradistinguished from the fuselage or catamaran or equivalent of the present invention, which will as hereinafter explained be practically as unsinkable as a cork, giving way always to any heavy and abrupt wave shock, and so surely saving the airplane from destruction in many storms so severe and persisting so long as to break up and sink a rigid and sluggishly tossable hull. The price may be severe mal de mer to the passengers, but their lives will be saved.

Whatever the real reason, the fact is that the great majority of airplanes which have attempted, successfully or unsuccessfully, to make the Atlantic crossing, have been constructed as the result of choosing the second alternative, that following.

(II) This second alternative is, baldly, to use an ordinary land-alighting airplane for transoceanic flights. In other words, these land-alighting airplanes have been put, for flights necessarily lasting twenty-four hours and over, to the bare chance that continuously favorable weather conditions and concurrently continuously favorable mechanical conditions (as to all the component parts, engine, wings, bracing, fuel-supply lines, etc., of the airplane) will persist long enough for the entire flight.

According to the present invention, a transoceanic airplane can be constructed, practicably, at about the same expense as any airplane of a previously known type; which new airplane, however, is adapted in all seasons to fly the shortest-line routes between different continents, for instance, along the northern courses in trans-Atlantic travel,—because such airplane can, whenever required, easily alight on, or take off from, any point on the land, on the ocean, or on any large ice body; and if alighting on the latter, can travel along the same and launch itself into open water as soon as encountered; and whenever on open water can stay afloat indefinitely, and proceed to port of destination, or toward such port and to a point where it may again be able to resume its journey by air; all under its own power, thereby to save even salvage charges.

Because of the foregoing, the new airplane can be flown at low altitudes and yet high speeds from port of departure to port of destination; thereby avoiding fog and storm areas, precluding ice formation on lift surfaces, and enhancing the attractiveness of the voyage by having the sea and its ships always in view.

All these aims can be satisfied, because the invention attains the objects of (*a*) providing a fuselage, or equivalent, which avoids the dead-weight of the ship-type fuselage heretofore always employed in flying boats and incorporating a massive and staunchly constructed ship's hull,—this following from the fact that the new fuselage is leak-liable yet non-sinkable; (*b*) providing a leak-liable yet non-sinkable construction for tip-adjacent or other appropriate wing-portions, in combination with means for quickly and readily readjusting such wing portions when required, to save them against destructive battering by high waves, by, for example, transforming the airplane from a water-borne object having naturally a tendency toward wide-arc rolling unable to withstand heavy wave pounding against the wings particularly, into the most stable and safest type of water craft heretofore devised, to wit, the catamaran; (*c*) providing a means for quickly and easily, when required, redisposing the engine, or engines, and their massive bed-plates, or similar mountings—from their high positions forward whereat, with the airplane afloat on the water, they not only would tend to drag the ship down at the head but would seriously impair long continued seaworthiness due to excessive metacentric height with the center of gravity so high over the center of buoyancy that equilibrium is unstable or undesirably close to instability,—to another position where these disadvantages are not present; and (*d*) providing, among other things, one or more "sea anchors" readily droppable from the proper point or points and of sufficient weight to act, yet so constituted that said weight thereof is not carried as an addition to the great normal dead weight now necessarily carried by the airplane.

Only when these advantages (*c*) and (*d*) are provided, is the entire invention of complete adequacy to the problem involved. Said objects (*c*) and (*d*) are attained by the present invention, because such engine or engines and/or their bed plates, when redisposed according to (*c*), become the sea anchor or anchors referred to under (*d*).

Such sea anchor or anchors can, according to the invention, be withdrawn within the body of the airplane, after the calming down of say the exceptionally severe storm which necessitated a sea anchor or anchors,—if, to attain center-of-gravity depression, said sea anchor or anchors have been submerged below the water; so that then the airplane, as a ship, can proceed under its own power, (as by means of a normally retracted marine propeller now projected below the water-line, and a special small engine to drive the same, and an auxiliary fuel tank to feed such engine), toward a ship lane or toward a selected port.

While, according to the invention the water-buoy elements of the leak-liable fuselage and/or wing or wings may be any suitable material, as, for instance, cork, balsa wood, kapok or the like, the latter is now first preferred, with preferences now next for granulated cork or comminuted balsa wood. As to these preferences, in the first place kapok, especially the yellow Brazilian variety, is practically a drug on the market and hence of negligible cost. Secondly, if any one of the three preferences last stated is put into effect, a special airplane need not be built to practice the invention; since the fuselage or wing walls need not be constructed around the water-buoy elements, as might be required were these latter cork slabs or balsa wood timbers. Instead, the flocculent kapok or the granulated or comminuted substitute buoyant material, or a desired mixture thereof, may be packed in bags and these filled bags may be pulled into an airplane, say a Junkers or Stout airplane, already constructed, through the craft's doors, windows or other openings, and packed into their appointed locations.

According to the present invention, then, there is stored in all, or a sufficiently numerous group of, otherwise clear-way spaces or compartments, in the interior of the wing or wings and/or the fuselage or the like in lieu of the air heretofore occupying said spaces or compartments, a collection of material according to the invention and preferably of the nature just referred to, that is, having the qualities among others, of being (*a*) water-repellent; (*b*) of a buoyancy substantially equal to, or sufficiently near, that of air; and (*c*) fire-proof, or capable of being cheaply and otherwise practicably protected against the dangers of communicated fire and of spontaneous combustion. Desirably, also, this material should be comparatively inexpensive, and even more inexpensive than cork. Desirably, further, this material should be obtained in such bulk-characteristics as to be easily entered into and packable within, said spaces and compartments. In view of the two desiderata last-mentioned, the invention is preferably carried out by employing, so far as the various materials available are now known, such materials as those hereinabove mentioned. When kapok is the material utilized pursuant to the invention, it is preferably kapok of the yellow Brazilian variety, as aforesaid. Kapok is a weed grown largely in Java. It is full of minute air cells; it sheds water like duck feathers, and while it has a minute longitudinal air-bore, this is too small for the entrance of water by capillary attraction. Javanese kapok is white in color and in high demand; while Brazilian kapok, simply because yellowish in color, although otherwise exactly like the kapok from Java, is more or less a drug on the market today. Therefore, when it is realized that Javanese kapok is quoted now at considerably less than a few cents a pound and that a pound is really the weight of a very large mass of kapok (kapok having a floatability which is a multiple of that of cork),—it can readily be calculated that the cost of equipping even a large hollow metal trans-Atlantic air-liner, pursuant to the invention, is exceedingly moderate, if not negligible, all things considered.

Following the discoveries of Junkers, Stout and others in regard to the high importance of negative lift in the sustentation of airplanes, the so-called fat-wing was evolved. Such wing is today commonly accepted as the real practicable answer to the problem of constructing an airplane with adequate lift, safe cruising ability and capacity for long flights while carrying a large useful load, all due in some part to the elimination of parasitic air-attacking surfaces. In the first place, such a fat-wing cuts down wind resistance from non-lift elements to the minimum. This is so because there may be eliminated all external bracing, struts, guy wires, and the like, so characteristic of the early "flying bird cage" which the pioneer Wright machine was. Such fat or thick wing, further, compares favorably, from the standpoint of sustentation, with a plurality of thin wings, one above the other, of similar camber and lift area. Such fat or thick wing, again, compares favorably, from the standpoint of structural strength, with a plurality of thin wings, interbraced by external struts, guys and the like, due to the fact that the chamber or chambers formed within the fat wing is a container for a criss-cross, abeam as well as fore and aft, system of internal bracing, of proper strength and lightness;—especially where a metal like duralumin is employed for fabricating such bracing (as to make the spars, or abeam bracing-members, and/or the ribs, or fore-and-aft bracing members), and duralumin or a similar light weight alloy or metal is employed for the wing sheathing or skin. Moreover, the available free spaces inside such a fat or hollow wing or wings, considerably increase the freight and passenger carrying capacity of the airplane; for instance, for the storage of fuel tanks in wing compartments.

This advantage last mentioned (the availability of clear-way spaces in a hollow wing for carrying equipment, and cargo, and providing living quarters) may be emphasized by pointing out what is also well known in the art, following said discoveries of Junkers, Stout and others. This is, that the fat-wing may be made very fat or thick, in some cases to have its maximum vertical dimensions, about one-third the way back from the leading edge, a third or even more of the maximum fore and aft dimension of the wing. The resulting comparatively thick and blunt leading "edge" has been proved to be an advantage rather than otherwise, because of the fact that the forward-lying air kicked up by such leading edge materially increases the vacuous zone overlying the wing top, and hence materially increases the highly important negative-lift factor.

A hollow metallic internally braced wing is believed to be, therefore, one of the characteristics of the future airplane, particularly the large passenger or freight liners for trans-Atlantic and other similar ocean flights. For reasons already indicated, a fuselage of the non-boat-hull type is also believed to be another characteristic of such future liners.

Yet airplanes are not likely ever to come into popular favor, for shipping valuable freight, or for passenger travel between continent and continent, in view of the statement last made in the preceding paragraph, unless another condition be provided for, to-wit, the ability of this airplane, carrying valuable goods and even more valuable human lives, and yet not having a boat-hull fuselage but instead having a landing-wheel-equipped fuselage or equivalent, to volplane or otherwise come gently and safely to rest say in mid-ocean, following any mishap whatever, no matter how unexpected. Among the more familiar of such mishaps which may be mentioned are engine failure, fuel line failure, drained fuel tanks, sudden alarming structural instability, ice or sleet coating on the wing surfaces, crumpling or breaking of a wing section, and a loss of a landing wheel or other part of the landing gear. In regard to the mishap last mentioned, this would not, of course, necessitate an immediate landing in mid-ocean; but the landing gear loss, if noticed in time, would make it advisable to bring the plane down in some sea-port, wherein it could be kept afloat for a considerable length of time. As to an enforced alighting of the plane in mid-ocean, for any of the reasons above indicated or otherwise, the necessary condition to be provided for would be the ability of the airplane to remain afloat for days, and even weeks desirably, without danger of foundering, so that emergency ration stores, and a suitable supply of flares or other signals to attract the notice of surface vessels, may sustain life, and hope, until rescue.

The prime object of the present invention is to attain the end last referred to (to-wit, the safe alightability and the long-continued floatability on water of any airplane, even one having landing wheels or an equivalent); and particularly to attain such end in an airplane having a hollow metal wing and/or of hollow metal construction throughout.

A fundamental fact facing the present invention, and taken advantage of by it, is that an airplane of the type just discussed and covered by metal sheathing is not and cannot be sealed hermetically or made water-tight at joints and cracks. Such sealing is impossible, actually, or as a matter of practicality; due to several facts. In the first place, it is desirable, if not necessary, to allow for certain relative movement of the parts sufficient to avoid reducing the structural safety factor, by too much increasing the rigidity, and consequently by too much reducing the elastic yieldability, of wing and fuselage parts, per se, and also of the merging portions of wing and fuselage. Again, any attempts to maintain such sealing could not be depended on, even if frequent and expensive inspections and tests of air-tightness be made while the airplane is at rest at a land terminus. The uselessness of such inspections and tests ought to be manifest, since the very lack of elastic flexibility brought about by the aforesaid sealing is likely, while the airplane is aloft, suddenly to develop a break or the like, at every change of air-pressure against the wing, especially upwardly acting air-thrusts near a wing tip.

The present invention, then, as to the features thereof now being considered, meets and faces and ignores the necessarily leak-proof character of hollow-metal-wing aircraft, by utilizing the very peculiarity of structure characteristic of the same and which is responsible for the leak-proof character thereof, by storing therein, permanently, an instrumentality which will make of each wing or other aerofoil subdivision to which the idea is applied, a buoying means for the airplane when the latter is compelled by the unexpected contingency to alight in mid-ocean, and to make this subdivision of the airplane such a buoy even when the same is otherwise water-logged as the result of its leak-proof character while at the same time utilizing the interior spaces of the wing, such spaces made practically possible only because the wing is constructed as a leak-proof one, to store and hold a buoying material, thus to give full aerodynamic efficiency to the wing while in air-flight.

When kapok or other similarly smolderable or otherwise combustible material is used as the material stored within the airplane pursuant to the invention, another feature of the invention is the preferable treatment of the same with a water repellent material; and when kapok or balsa wood or another combustible material is used in baggable form, such material is preferably packed into bags or sacks which are of asbestos cloth or otherwise fire resistant.

At the present date it is of course the fact that the weight per horsepower of the engines for driving the propellers of airplanes is so large, and the total weight and bulk of the fuel having to be carried are so great, that it is hardly feasible now to contemplate building any airplane capable of carrying an adequate power plant and a total fuel supply sufficient for a non-stop flight across the Atlantic, and, at the same time, a considerable freight cargo and/or a large number of passengers in addition to the crew. It is the belief, however, that at some date in the reasonably near future a modified or entirely new type of power plant, and/or perhaps some new or hitherto untried power supply therefor, may be developed; with the result that such non-stop flights will become practicable, safe and dependable no matter what head-winds or other untoward and unusual weather conditions are encountered. In this connection, it is pointed out that with the metal parts of the airplane (except some parts of the engine or engines) constructed of duralumin or some equally light metal, the actual extra weight having to be carried, because of incorporation of some or all of the features of the present invention, is comparatively small. And pending the development and availability of such a new power plant and/or fuel as that just above referred to, the present invention is by no means of inutile employment for transoceanic flight. For instance, Armstrong has worked out very satisfactory artificial islands to be anchored at spaced points five or six hundred miles apart along the usual courses of trans-Atlantic surface liners. Even these, however, need not be used where the transoceanic airplane employed for freight and passenger conveyance is pursuant to the present invention. This follows, from the capabilities of such an airplane for easy and safe alighting on, and equally easy and safe taking off from, the surface of the ocean. Therefore, the comparatively expensive Armstrong and similar artificial islands need not be employed in connection with transoceanic airplanes according to the present invention. The extreme costliness of these artificial islands arises from the fact that they essentially include plane upper surfaces of great area to provide landlike alighting and taking-off fields for the ordinary airplane.

In other words, where an airplane constructed according to the present invention is employed: Fuel-carrying surface ships of any desired type can be stationed at the proposed loci for the Armstrong islands, either anchored thereat or cruising locally thereabout. Then, when a transoceanic airplane according to the present invention alights on the ocean at any such locus, the two craft may draw alongside each other for refilling of the fuel tanks of the airplane. These fuel-carrying surface ships, theoretically, need never leave their cruising zones; as they can themselves receive stores for the crew and have their supply tanks refilled from ordinary surface liners as the latter from time to time pass and repass within hailing distance of said zones and note a signal flown by the fuel-carrying surface ship therein and by a prearranged code indicating that fuel and/or supplies need replenishment.

The present application is a continuation in part of my U. S. patent application Serial No. 344,959, filed March 7, 1929.

In the drawings forming part of the present application, certain now preferred embodiments of the invention are illustrated, but merely in exemplification of, and not in any way to delimit the invention.

In said drawings:

Figs. 1, 2 and 3 show, respectively, in front elevation, top plan and side elevation, an airplane embodying the invention.

Figs. 4, 4*a* and 5 illustrate various details of said embodiment; Fig. 4 being a section taken on line 4—4 of Fig. 2, Fig. 4*a* being a section taken on line **4*a*—4*a* of Fig. 4, and Fig. 5 being a section taken on line 5—5** of Fig. 4.

Figs. 6 to 12 illustrate another embodiment; Fig. 6 showing the airplane in perspective (with the nacelles for the port outboard engine, and the propellers driven thereby, shown in dotted-and-dash lines), Fig. 7 showing the airplane in side elevation, partially in section, and also illustrating parts of the airplane readjusted to assist in trimming the craft in a fore and aft direction and to prevent or minimize pitching, Fig. 8 being an enlarged fragmentary perspective of the fore part of the fuselage after the engine has been unbolted and thrust loose for dropping the same as a sea-anchor. Fig. 9 showing the airplane afloat, and in front elevation, and with outer wing sections thrown out of their normal flying positions to constitute outboard pontoons and thus to cause the entire craft to ride the water as a catamaran to avoid or minimize rolling, Fig. 10 being an enlarged section taken about on line 10—10 of Fig. 7, Fig. 11 being a top plan view of Fig. 10 with certain parts broken away, and Fig. 12 being a vertical section through a fuel tank contained in the hollow wing shown in Figs. 10 and 11;

Figs. 13, 14 and 15 illustrate still a third embodiment, Figs. 13 and 14 showing, respectively, the craft with its wing equipment arranged in flying condition, and the craft, afloat on water, with its wing equipment readjusted to avoid or minimize rolling, while Fig. 15 is an enlarged view, partially in section, of the right-hand wing section as shown in full lines in Fig. 14.

Similar reference characters refer to similar parts throughout the views.

Figure 1:
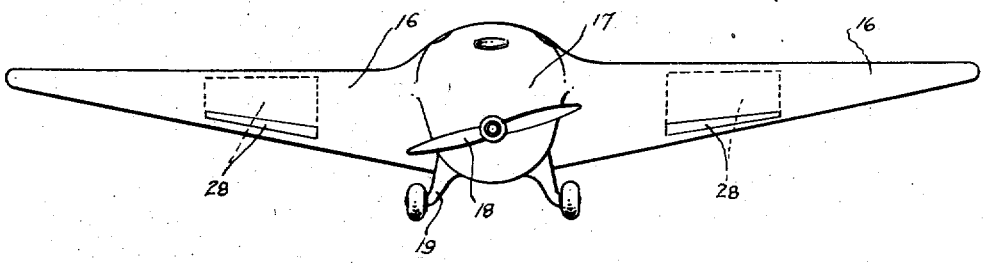
Figure 2:
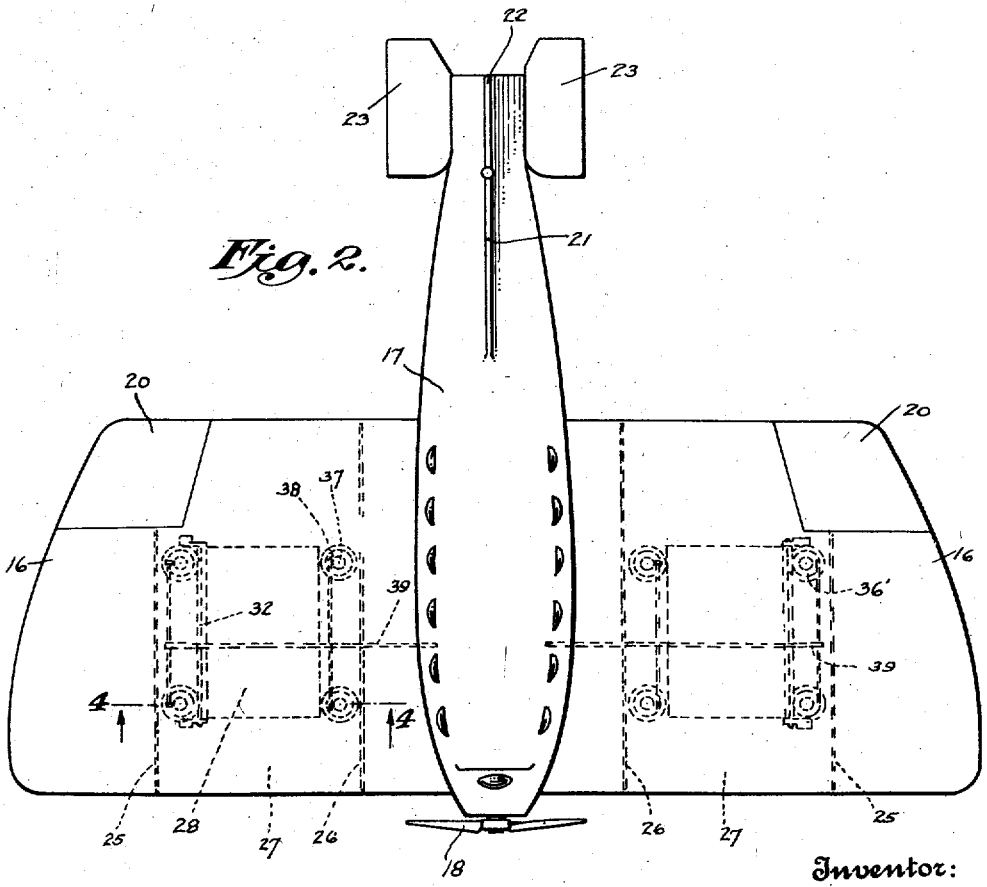
Figure 3:
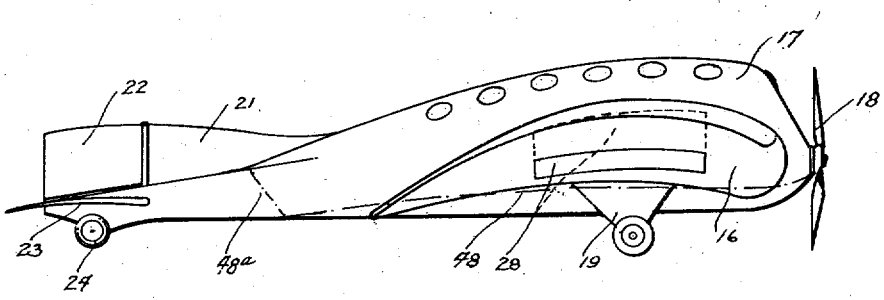

Referring to Figs. 1 to 5, the wing sections are indicated at 16, the fuselage at 17, the propeller at 18, the landing gear at 19, the ailerons at 20, the fin at 21, the rudder at 22, the elevators at 23, and the tail-wheel at 24.

The airplane illustrated is of the hollow internally braced type. The double broken lines in Fig. 2, marked 25 and 26, are fore and aft partitions extending from top to bottom of the wing interior and cutting off from other parts of the wing interior more or less central compartments 27 in each wing section for the accommodation of fuel tanks 28. These tanks feed fuel-supply lines like that indicated at 29; each such line 29 being in part composed of a readily frangible section 30 adjacent the tank. The partitions 25 and 26 are preferably made of a central layer of asbestos **25*a* or 26*a* and of outlying stiffening layers of chicken wire or the like 25*b* and 25*c* or 26*b* and 26*c*. The wing is covered with a sheathing 31 except at the bottom of the wing opposite the compartments 27. As shown, the fuel tanks 28 are so mounted in their compartments 27 and the bottoms of said tanks are so cambered or otherwise shaped, that said bottoms form smooth continuations of all the adjacent lift-surfaces of the sheathing 31. The means for mounting each tank 28 rigidly and securely in position, and yet so that such tank may be readily released from the airplane, to increase the floatability of the airplane once the latter has alighted upon the water, includes the following parts, in addition to fuel-feed-line 30: At its outboard lower edge, each tank is supported pivotally on a fore and aft shaft 32, and at its two upper edges by a plurality of rollers 33 resting on metal shelves 34 to the right in Fig. 4 piercing at its inboard end the partition 26. During continued integrity of said shelves, the tank, even when full, is rigidly and securely held in place. Each such cylindrical structure is composed of an outer duralumin sleeve 36*a* an inner similar sleeve 36*b*, and an intermediate cylindrical wall 36*c* of refractory material of the type having a few large or a multiplicity of small cavities, a considerable capacity for pocketing air and hence being of light weight compared to bulk, yet of high compressive strength. Overlying the central vertical bores of these cylindrical structures 36 are cans 37 of thermit. Opposite each can is a swinging rip-claw 38 on an arm pivoted to a slide rod 39 having a handle 40 extendible into the navigating compartment. When this handle is pushed toward the left in Fig. 4, claws 38 rip cans 37, and the thermit in said cans burns instantly through the metal or other shelves 34, and releases the associated tank 28 to fall by its own weight through the open bottom of compartment 27 until hanging only on shaft 32. Shaft 32 is of a size and material such that the weight of the tank will break the shaft and permit the tank to tear free. The tank will not, ordinarily, if ever, be thus freed by operation of handle 40, until the airplane has alighted upon the water; in which situation the ultimate tearing free of the tank will permit the now empty compartment 27 to assist other means to be described in the following paragraph, in prolonging the floatability of the airplane as a sea-riding craft. In view of the provision of the means last referred to, there will be no particular need of great speed in dropping the tanks 28, and consequently in order to preclude any possible accidental ripping of the cans 37 while the airplane is afloat, the following parts are provided: Slide rod 39 has fixed thereon a keeper 41 for a bolt 42 guided in a sleeve 43 and having a transverse slot 44 engaged by a pin 45 eccentric on the barrel of a lock 46. The key 47** for said lock is not ordinarily in the lock. Hence there is no possibility of accidentally ripping the thermit cans.

Figure 4:
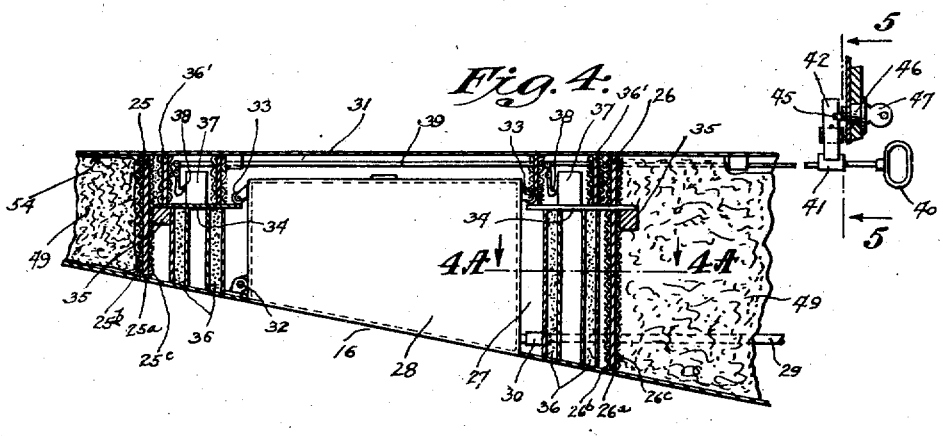
Figure 4A:
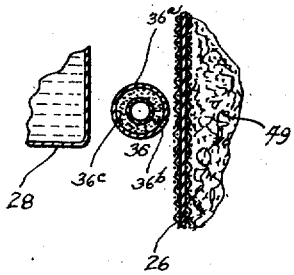
Figure 5:
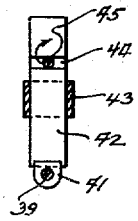

Within the interior of each wing section, on opposite sides of the walls 25 and 26 from the compartment 27, and also within the ailerons 20, as well also as in the lower part of the fuselage, are housed masses of a material, solid, liquid or gas, floatable in water, and which, by filling said spaces, exclude water. As shown in Fig. 4, the material now preferred to be employed is mainly kapok. Desirably, this kapok is stuffed in sacks or bags 54, as shown to the left of partition 25; which bags, and the thread by which they are stitched together, are made of asbestos cloth and asbestos yarn. Desirably, also, said asbestos elements are waterproofed. To avoid any possible accidental chance of even a smoldering burning of the kapok or equivalent it is recommended that the same be fire-proofed by impregnation with ammonium phosphate, sodium phosphate, or sodium tungstite. It is understood that these salts are water soluble; but water cannot well reach them through the bags or sacks 54 when the latter are water-proof as just above.

Figure 10:
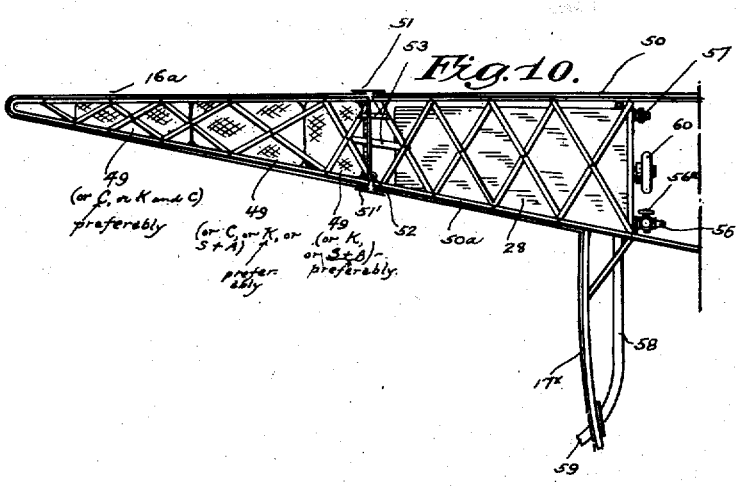
Figure 11:
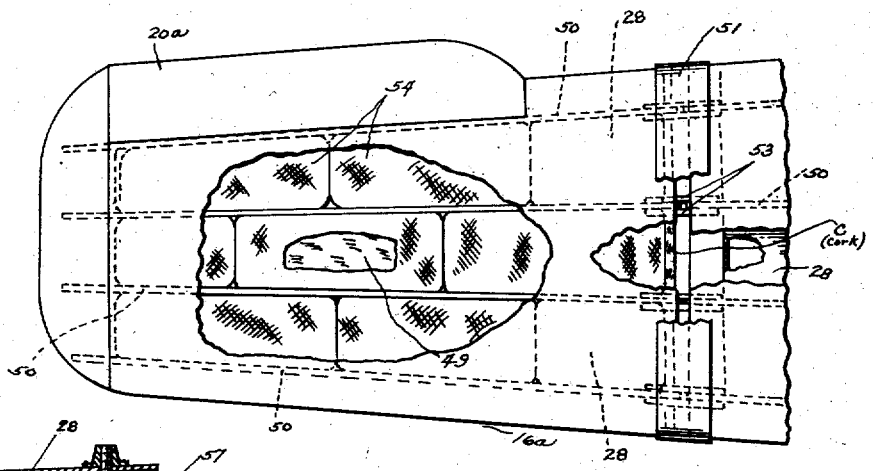
Figure 12:
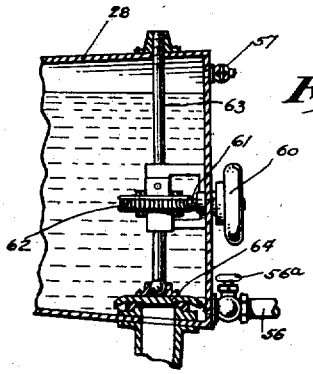

In all the embodiments, the spaces in the airplane may be filled with kapok, or cork, or an equivalent solid, as balsa wood, or a gas (as air) in a sac, or other sealed container, or with various combinations of two or more of these auxiliaries. To indicate this, graphically, note that in Figs. 10, 11 and 15, the letters C, K, S and A are used as respectively designating cork, kapok, airtight sac, and air. But, as will be brought out in a paragraph near the end of this specification, an essential of the invention herein disclosed is the avoidance (in an airplane having a leak-liable sheathing containing an adequate amount of buoyant material adapted nevertheless to keep such airplane afloat indefinitely on the water, and as a part of said adequate amount of buoyant material) of air or gas in a sealed container or containers or of any other buoyant material, which, on distortion or deformation thereof, or on injury to a wall enclosing the same, can cease to continue to act as a buoying means for an airplane.

Referring to Figs. 6 to 12, the wing sections 16s are provided with a fore and aft corrugated sheathing, except at the wing tips 16a, which for convenience are given plain sheathing. The familiar leading-edge-overlying sheet of sheathing is indicated at 16b.

The wing spars include spar-beams 50 and 50a interrupted in about the central vertical plane of an auxiliary fore-and-aft sheathing strip 51; sufficiently rigid integrity of these spars being provided by the conjoint action of said strip 51, a rigged shaft 52 interconnecting the two sections of lower spar-beam 50a, and a plurality of tie braces 53. Thus each spar is really an aligned pair of inboard and outboard spars arranged in uniplanar relation, but adapted, when the strip 51 is ripped off, and the braces 53 are cut, to permit each outboard wing section, containing asbestos bags 54 of kapok 49, to swing about shaft 52 and drop to the position shown in Fig. 9, once the airplane has alighted upon the water. Suitable temporarily installed braces, as indicated at 55, may then be attached, to hold the outboard wing sections in catamaran position.

In the embodiment now being described, the fuel tanks 28 are placed between the various spars, but here are wholly in the inboard wing sections or the wing sections which are permanently coupled to the fuselage 17x. The normal fuel line from such a tank is indicated at 56 in Fig. 10, and is shown as being provided with a cut-off cock 56a. Each such tank is further equipped with a vent valve 57, a fuel draining pipe 58 discharging at 59 on the exterior of the fuselage, and a hand-wheel 60 fixed on a worm shaft 61, the worm of which meshes with a worm wheel 62 on a screw shaft 63 carrying at its bottom a valve member 64 normally constituting a closure for drain pipe 58. Thus, when the airplane is on the water, its floatability may be increased by closing cock 56a, opening valve 57, and operating hand-wheel 60 to open communication between the associated fuel tank 28 and its drain pipe 58. In order to have a man-way passage between the fuel tanks, the central fuel tank 28 (Fig. 11) could be omitted.

Figures 6, 7, 8, 9:
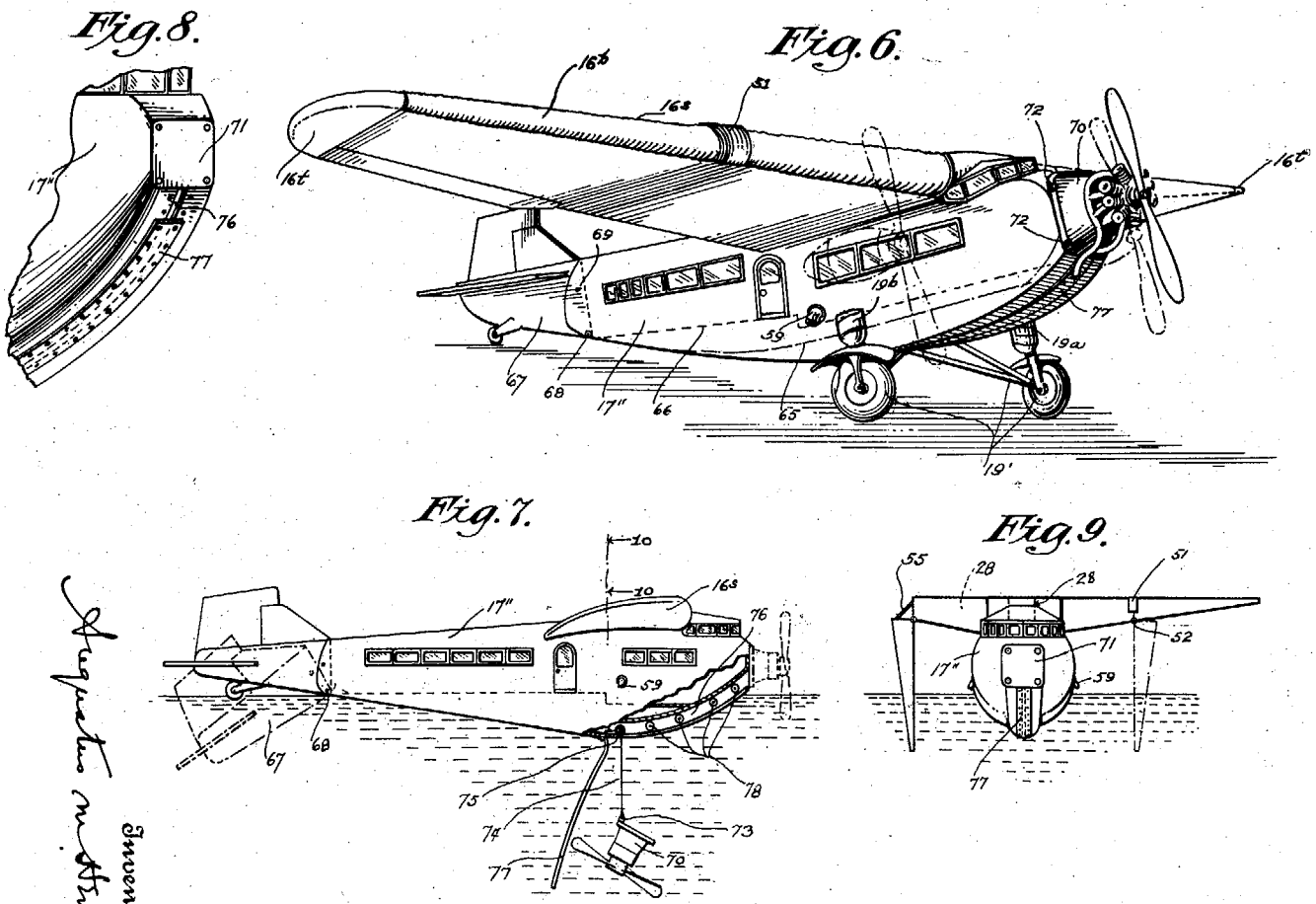

Referring to Fig. 6, the dot-and-dash line 65 indicates the bottom line of the fuselage; and if the floor line within the fuselage be located as shown in broken lines at 66, a compartment of admirable size, shape and location for the purpose in mind to permit housing of the material of the invention, is provided. That is to say, asbestos bags distended with contained kapok may be located in said compartment; and watertightness of the fuselage be eliminated as a source of concern.

Referring to Figs. 6 and 7, at 67 is the after portion of the fuselage, pivoted at 68 on the main fuselage body; and also suitably carries buoyant material. The airplane, when afloat, has a tendency to go down by the tail. The rivets above pivot 68 may be chiseled away, and the section 67 of the fuselage forced downwardly about the pivot 68 and braced in the proper position to give the floating craft the proper trim.

Referring to Figs. 6, 7, 8 and 9, the engine 70 is bolted on plate 71 by bolts 72. If the nuts on these bolts are removed and the bolts knocked out, and the engine disconnected from the fuel lines, ignition lines, etc., and the inboard propeller shaft bearings be dismantled, the engine by its own weight will drop free. In order that this end may be attained, and the engine utilized as a sea anchor and thus salvaged, the engine base, as shown in Fig. 7, carries a bolt 73 to which is secured a cable 74 connected to an eye bolt 75 anchored to the bottom of the fuselage, at the end of channel 76 normally covered by sheathing 77, which, in conjunction with a line of idler rolls 78, normally holds said cable in unentangled continuation in the channel. When the engine is released for dropping, the engine falls from the broken line to the full line position of Fig. 7, as the result of cable 74 ripping away strip 77 to throw said strip to the position shown in Fig. 7.

Figure 14:
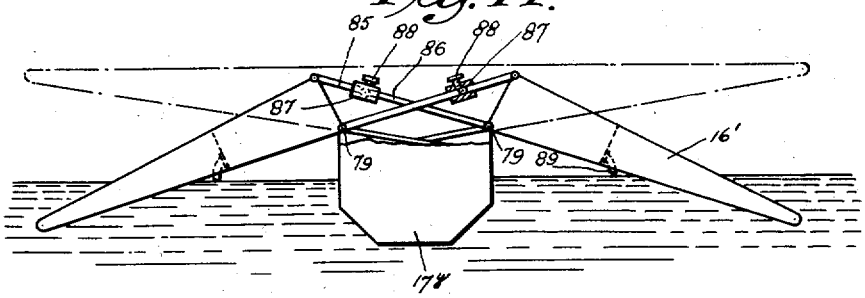
Figure 13:
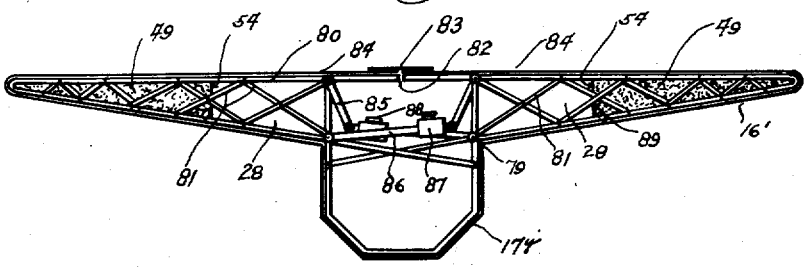
Figure 15:
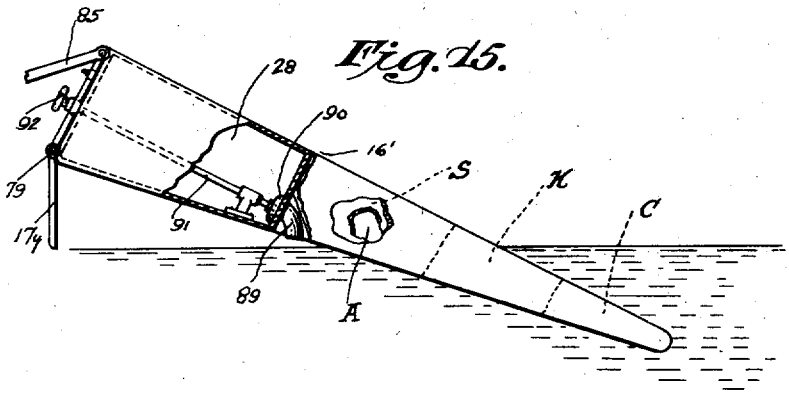

Referring to the embodiment of Figs. 13 to 15, the fuselage 17y has pivotally mounted thereon the entire wing equipment by shafts 79. While in flight, the top spar beam 80 of each spar 81 is continuous across the airplane from wing tip to wing tip. In order to permit said spar beam to be readily cut, as at 82, an overlying strip 83, to be preparatorily ripped off, is riveted to overlie the main sheathing 84. Once this strip is ripped off, and the top spar beams of all the spars cut, each wing section drops from the flying position of Fig. 13 to the catamaran position in Fig. 14. This straightens out the links 85 and 86 to the positions shown in Fig. 14, from the collapsed positions shown in Fig. 13. These link pairs may then be employed as braces, by sliding up the collars 87 to overlie the points where the links are interpivoted, and then tightening the set screws 88. In this embodiment the buoyant material is seen at 49, and the fuel tanks with quick discharging means at 28, said means including a drain pipe 89, a normal closing valve 90, a screw shaft 91 and a handwheel 92.

Figure 16:
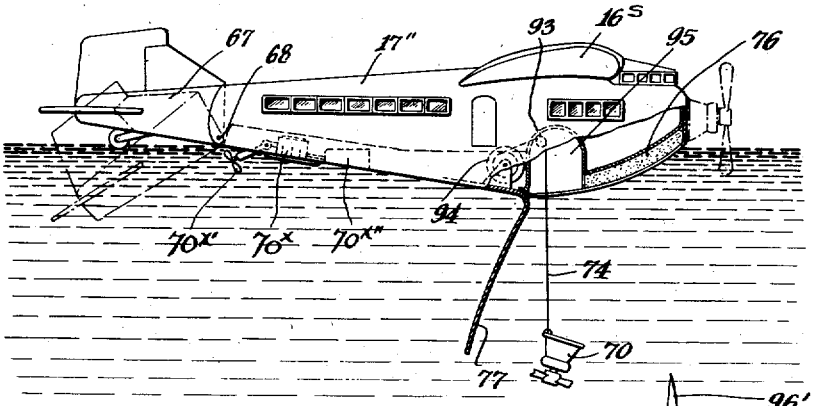
Fig. 16 is a view like Fig. 7, but showing a modification.

Fig. 16 shows a variation in the airplane of Fig. 7. Here the engine 70, shown with its propeller blades sledged off as they desirably would be before the engine was dropped, is connected as before to a cable 74; but this cable is passed over a pulley 93 and secured at its other end to the drum of a windlass 94. This pulley is in the upper part of a compartment 95. When the storm which required the dropping of the engine has abated, and it is desired to propel the airplane forward as a watercraft by driving a marine propeller 70*x*′ from an auxiliary engine 70*x*, the windlass is first operated to retract the engine 70 completely into compartment 95 (to avoid water-friction drag therefrom). The propeller 70*x*′ is lowered from a normally retracted position to that shown, and the engine 70*x* started. If a gasoline engine, it may be fed from the ordinary tanks; or, if these are empty, from an auxiliary gasoline tank 70*x*″.

Figure 17:
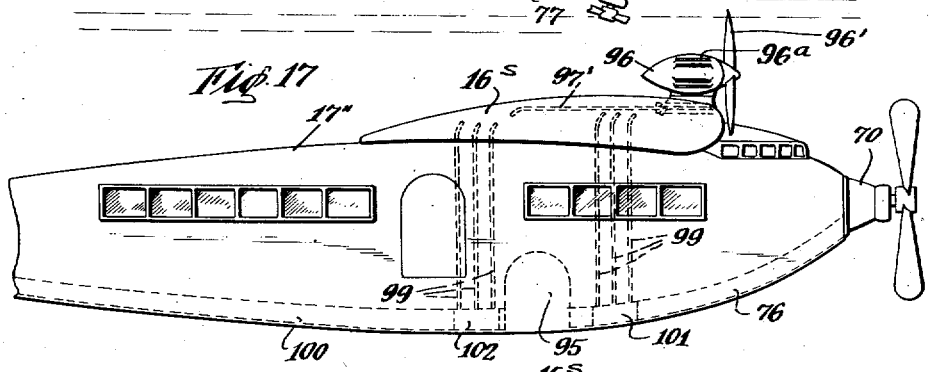
Fig. 17 is a side elevation showing the forward part of the airplane of Fig. 16, but modified to permit of the three engines of a trimotor ship being employed as sea anchors according to the invention.
Figure 18:
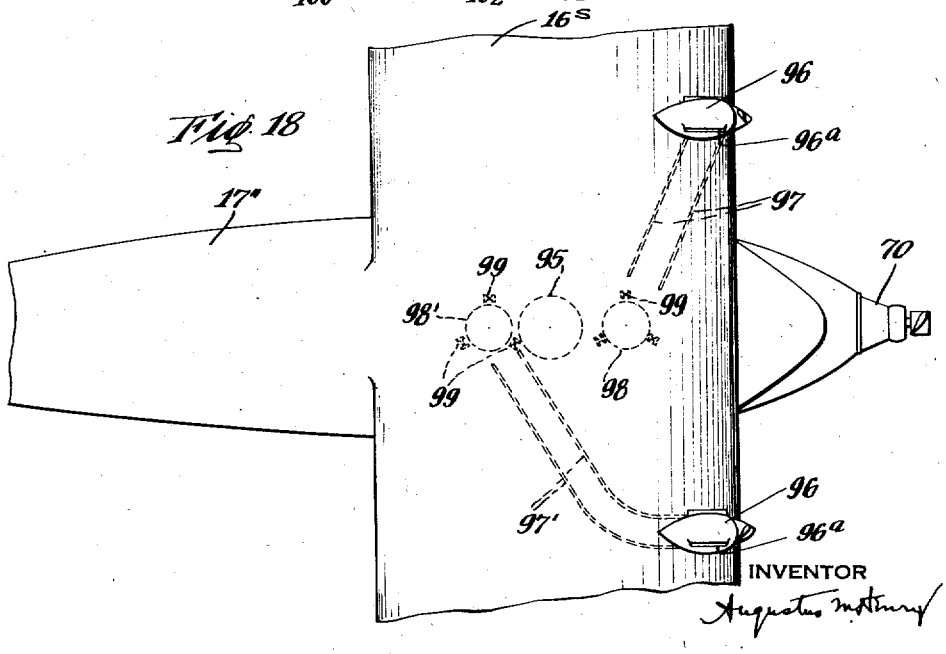
Fig. 18 is a top plan view of the parts shown in Fig. 17.

Referring to Figs. 17 and 18, showing the trimotor type of Ford (Stout) plane, the engine 70 is used as a sea anchor as already described. The other two engines, in the nacelles 96 can also be used as sea anchors according to the invention, because of the following provisions. Below the wing sheathing 16*s* are suitably mounted suitably rugged tracks 97 and 97′, one set of tracks leading to a point alongside a forward, vertical quasi-shaft 98, and the other set of tracks leading to a point at an aft, vertical quasi-shaft 99. The sheathing will be so laid that certain sections thereof, when ripped away, will expose said tracks and open up the upper ends of said quasi-shafts. These latter are termed such, because they are defined merely by three channeled posts 99,—each set of posts for guiding a nacelle for downward sliding through the quasi-shafts when their channels are properly engaged with the three sets of longitudinal flutings 96*a* on each nacelle. After the sheathing is ripped off as above, the nacelles are unbolted from their pad-mounts atop the wing; are, manually if necessary, by the airplane's crew set on their tracks and moved close to the quasi-shafts. Then a cable (not shown) is suitably attached to each nacelle; the opposite end of each cable being secured to the drum of its own windlass (not shown). Then, with the cables having only slight slack, the propellers 96′ having been removed and sledged off at their blades, the nacelles are up-ended and interfitted at their flutings with the post-channels of their appointed quasi-shafts, and dropped down into the latter. Then the windlasses are permitted to unwind, and the nacelles passing down the quasi-shafts, have their pointed after ends reach the zone 100 of buoyant material in the leakable fuselage. On the nacelles being further lowered, circular substructures 101 and 102 of the buoyant material packing are knocked away, together with fuselage bottom sheaths underlying said substructures; and the two nacelles drop to the depth desired below the water line to act as forward and after sea anchors in line with an intermediate sea anchor, to wit, the engine 70.

Figure 19:
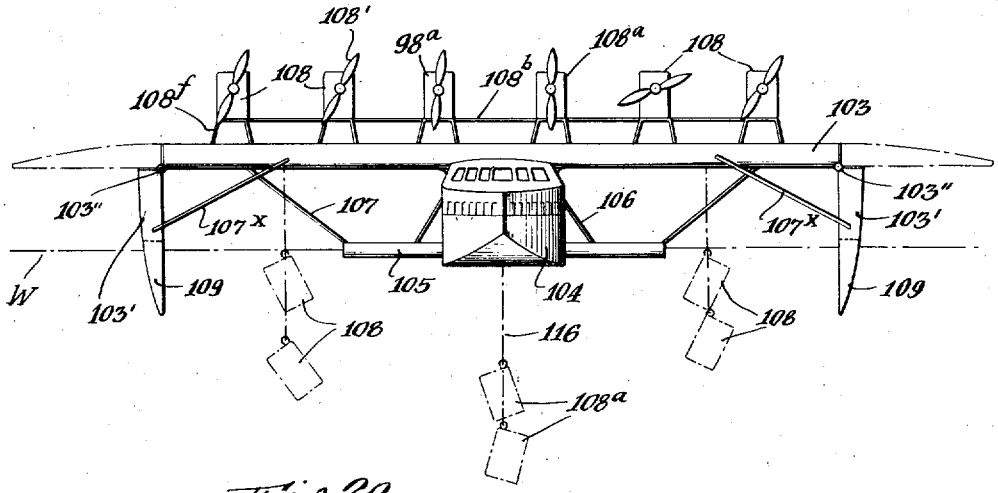
Fig. 19 is, in full lines, a front elevation of the DO-X design of airplane, equipped with elements, and operable, according to the invention,—the six above-wing engine nacelles being shown in dot and dash lines in their sea anchor positions.

Referring finally to Figs. 19, 20, 21 and 22, illustrating the DO-X design of flying boat: The wing 103, immediately above the fuselage 104 is braced thereto and to the stub wings 105, by the familiar struts 106 and 107. The parts 103, 104, and 105, are, however, constructed according to the invention; that is, leak-liable; and properly packed with buoyant material where required or desired; and, since the wing-tip portions 103′ are swingable downward, about pivots 103″, pursuant to the invention, the buoyant material in the wing may be limited if desired, the wing-tip interiors below the broken lines shown crossing these wing-tips as the latter are shown in Fig. 19, so that the buoyant material will be at 109, 109.

Figure 20:
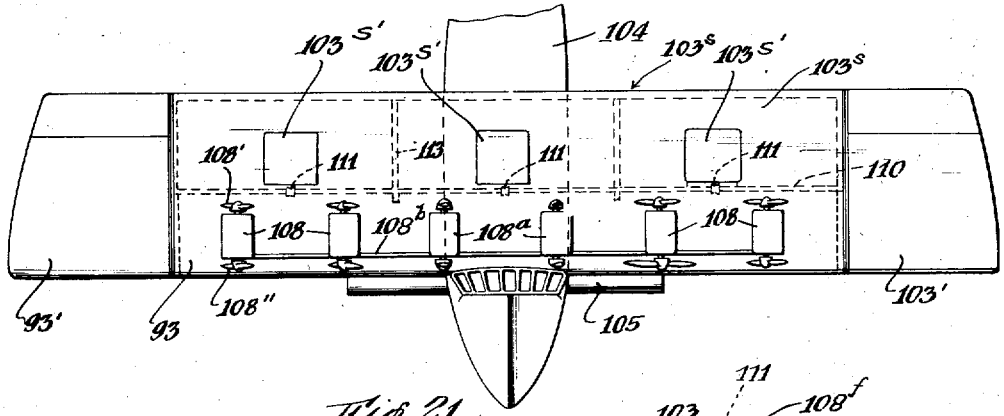
Fig. 20 is a top plan view, partially broken away, of the parts shown in Fig. 19, with such parts arranged normally, that is, for flight.

At 107*x* are indicated auxiliary struts, suitably temporarily attached to appropriate fitments secured to the internal structure of the wing 103 and exposable by ripping or chipping away parts of the wing sheathing 103*s*; these struts being normally housed in the airplane and not in use until the wing parts are arranged as in Fig. 20.

As to the six nacelles 108 and 108*a*, carrying their twelve propellers 108″, and mounted on a wing-top framework 108*f* tied athwartship by a brace-bar 108*b*, these are handled in emergency to provide sea anchors as described in connection with Figs. 16 and 17. The nacelles are divided into two groups each of two nacelles 108, and a middle group of two nacelles 108*a*. The nacelles of the middle group, having been disconnected from their mounts, are brought one after another to upended position over a central quasi-shaft constructed like those of Figs. 17 and 18, that is, defined by channeled posts like those in Figs. 17 and 18, except that the present posts (not shown) are four in number and are so spaced and arranged that the four longitudinal edges of the nacelles fit in their channels.

There are three of these quasi-shafts, the central one just mentioned, for the two nacelles 108*a*, and two fuselage-offside quasi-shafts each for serving an adjacent pair of nacelles 108.

The top of each such quasi-shaft is defined by an opening 103*s*″ in the main upper sheathing of the wing 103, such opening being exposed in an emergency by ripping off an auxiliary cover-sheathing 103*s*′.

Figure 22:
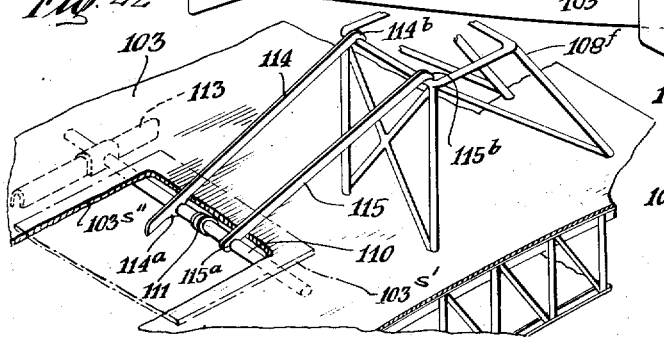
Fig. 22 is an enlarged perspective detail.

At 110 is a fairly massive bar or tube extended sparwise past the forward ends of the three quasi-shafts; there being mounted on such bar a pair of pulleys at each quasi-shaft, one of said pulleys being shown in Fig. 22 at 111.

Normally stowed away as are the struts 107*x*, are one or more pairs of slide rails 114 and 115, which, when a nacelle is to be descended toward its quasi-shaft, are temporarily applied to the bar 110 and the wing-top framework 108*f* as illustrated in Fig. 22. These rails at their lower ends have double-finger straddlers 114*a* and 115*a* for the bar 110, and at their upper ends have curved claws 114*b* and 115*b* to be hooked over a part of the framework 108*f* by being extended into suitable recesses (not shown) in the after ends of the nacelle bottoms. The rails will be held in place by gravity, for permitting sliding of each nacelle in turn down toward the upper end of its appointed quasi-shaft.

Figure 21:
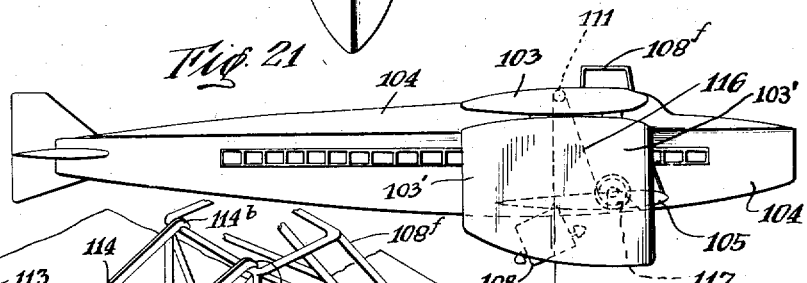
Fig. 21 is a side elevation, showing the parts as arranged in Fig. 19, and further showing said nacelles removed from above the wing and employed as sea anchors as per the dot and dash indication of Fig. 19.

As in Figs. 17 and 18, and as seen in Fig. 21, each nacelle, before being lowered down its quasi-shaft is secured to a cable 116 passing over a pulley 111 and thence to the drum of a windlass 117.

As a result, the six nacelles, when a terrifically rough sea requires, may be suspended, below the normal water-line indicated at W, as shown in Figs. 19 and 21; the propellers thereof desirably having first been removed, to leave merely the propeller hubs as shown at 108″ in Fig. 22.

The single engine in Figs. 6 and 7 is shown streamlined into the fuselage, to decrease parasitic resistance. The plurality of engines illustrated in Figs. 16 to 22 may likewise be streamlined into the fuselage, in which case the engines may be dropped, for use as sea anchors, in the same manner as shown in Fig. 7. Or, the plurality of engines shown in Figs. 16 to 22 may be streamlined into the wings of the airplane, and lowered by the same means set forth in connection with the latter figures. When streamlined into wing portions, the quasi-shafts may be located directly beneath all or certain of the engines, according to their location, with appropriate trackways beneath the engines leading to the proper quasi-shafts through which the engines are to be lowered.

As to the buoyant material of the present invention, the invention includes kapok, balsa wood, cork, or any equivalent material according to the invention, that is, any material which is itself capacitated to act as a buoying means, and which is employed for location at a selected point in the interior of an airplane component of the hollow leakable type, and which is, further, such a buoying means that by its own nature or constitution it will not only avoid adding too much dead weight but, also, it is in some manner porous and/or interiorly pitted and hence a carrier of air or other gas or gases and yet is present other than as a wall in the form of a water-tight bulkhead or analogous partition the continued integrity of the water-tightness whereof must be preserved to insure the prevised buoying action. For example, within the invention is not included such a buoying means as a metal air tank per se. Similarly, within the invention is not included spheres, sacs or other flexible-wall containers, whether or not of rubber or otherwise stretchable and distensible to contain air or any gas under pressure; nor a conglomerate mass of such flexible-wall containers as for instance might be provided in the shape of air-tight cavities in an enlarged sponge; nor a conglomerate of cells, cubicles or the like bounded wholly or partially by non-flexible-walls such as would be furnished by bubbling a salt or other chemical solution into an appointed zone and then allowing the water or other solvent to evaporate off whereby the residue of the solution establishes walls defining a plurality of air-tight spaces of greater than capillary dimensions in each of a plurality of perpendicularly related directions, and with these walls so brittle, frangible or otherwise constituted as to make likely the breakdown of such air spaces from an impact or indirect shock, or from distortion of said walls, or from crushing of the material of said walls which will result in a variation of the shapes of said air-spaces. As will be understood, all the above mentioned tanks, spheres, sacs, containers, cells, chambers and air-spaces having nothing in common with the buoying means of the present invention; the present invention providing as the buoying means a material having a multiplicity of minute entirely closed pockets and/or a multiplicity of porosities or fine tubes of so small a cross-section that, due to capillary attraction being unable to overcome the surface tension of the water, the addition of an intolerable water-load is prevented,—such material being, as aforesaid, kapok, balsa wood, cork or an equivalent. For reasons already stated, these three materials last mentioned, the fibrous kapok and balsa wood, and the cellulosic kapok, balsa wood and cork, either alone or in combinations of two or more, are now preferred; but this present preference is not to be taken to limit the invention thereto.

In the claims whenever the adjective buoyant is applied to any material, means or other recited element unless said material is otherwise particularly defined in a particular claim, it is to be taken as covering any material which satisfies the above definition of the new material of the present invention—a material which, it is pointed out, may be distorted or even largely shattered as by collision, crashing, machine-gun fire or otherwise, without so destroying its inherent buoyant characteristics as to prevent an airplane, equipped with it according to the invention, and forced to alight on even a rough sea, from remaining afloat for a considerable length of time.

In the claims, also, when a component is referred to, unless otherwise particularly defined, it is intended to designate the airplane as a whole, or any portion or part thereof, unitary or otherwise, or any portion of a unit forming part of the complete whole, which is leakable at or near its superficies; and when an air-attacking component is mentioned, there is meant any component exposed to the air during flight and/or contributing or adapted if properly designed to contribute aerodynamically, in some degree at least, toward increased efficiency in flight,—such, for instance, as a wing, a sponson, a pontoon, the fuselage or some other similar element.

Whenever a plurality of components is referred to in the claims, there may be meant the two wing halves when a single wing structure running from wing tip to wing tip across the airplane is employed, and whenever a fuselage is referred to in the claims there is meant the central structure of the airplane, whether a distinct fuselage or a substantially central compartment in a flying-wing type of airplane, even where the exterior of the airplane at such compartment merges imperceptibly with other wing portions.

I claim:

1. An airplane wherein there is a central structure and there are water-leakable wing-portions one on either side of said central structure, wherein masses of buoyant material are contained in said wing-portions to make them floatable in water, said material being crushable and deformable without so reducing its buoyancy as to render it ineffective to keep said wing-portions afloat, and wherein mounting and structural means for said wing portions are provided which include spar-structures running athwart the airplane unbrokenly through both said wing portions, and also other spar-structures having pivotally connected sections but with such pivots normally inoperable due to the first mentioned spar-structures, said first mentioned spar-structures being located for convenient breakdown by hand tools in an emergency.

2. In an airplane, in combination, a plurality of hollow water-leakable components, masses of buoyant material in said components to make the airplane float in water, said material being crushable and deformable without so reducing its buoyancy as to render it ineffective to keep the airplane as a whole afloat, said components being wing portions on opposite sides of a central structure, all three structures being of the hollow internally braced type; there being sheathing for the upper surfaces of said structures including main sheathing defining a space therebetween, means for mounting said wing portions droopably on the central structure, said mounting means including auxiliary sheathing secured over said space so as to be readily rippable away in an emergency.

3. In an airplane of the type having an air-attacking component, such component of the hollow internally-braced sheet-covered and hence leak-liable type yet providing interior spaces adaptable for carrying equipment, the combination with said component of the following instrumentalities for mutually cumulative action in preventing partial water-submergence of said component from causing the airplane as a whole to become so water-logged as to sink, to wit, (*a*) a mass of material accommodated in one of said spaces and floatable in water, and (*b*) a fuel tank in one of said spaces, there being associated with said tank means for more quickly than by engine consumption discharging the weight of such fuel from said tank, to make of the latter an air-confining buoy.

4. In an airplane of the type having an air-attacking component such component of the hollow internally-braced type so as to provide interior spaces adaptable for carrying equipment, the combination with said component of a mass of material accommodated in one of said spaces, said material being kapok, said mass of kapok being subdivided into sub-masses of various sizes to adapt said sub-masses each to be admitted as a unit to fill different size spaces in said compartment, there being provided for each of said sub-masses a fire-resistant sack in which the kapok is stuffed.

5. In an airplane of the type having an air-attacking component, such component of the hollow internally-braced type so as to provide interior spaces adaptable for carrying equipment, the combination with said component of a mass of material accommodated in one of said spaces, said material being kapok, there being a container for said kapok formed of a material normally water absorbent but fire resistant, said last mentioned material being treated to resist such absorption.

6. In an airplane of the type having an air-attacking component, such component of the hollow internally-braced and leak-liable type yet providing interior spaces adaptable for carrying equipment, the combination with said component of the following instrumentalities for mutually cumulative action in preventing partial water-submergence of said component from causing the airplane as a whole to become so water-logged as to sink, to wit (*a*) a mass of material accommodated in one of said spaces and floatable in water, one of said spaces and said material therein being located in a section of the airplane constituting a wing portion thereof, and (*b*) a fuel tank in the airplane, there being means operable, when the airplane is afloat on the water, for detaching said tank and dropping the same free of the airplane for jettison purposes, to increase the floatability of such wing despite possible water-logging thereof at certain portions, at a point which, combined with said material in the wing, will maintain the wing at such a weight compared to its volume that said wing when partially submerged while the airplane is afloat will act as a buoying instrumentality for the airplane.

7. In an airplane having a plurality of hollow air-attacking or airfoil subdivisions, such as wing and fuselage portions, the combination with such a subdivision, and one so located on the airplane that when the airplane has alighted on a body of water and rough weather occurs said subdivision is subject to at least partial submergence, of (*a*) structural characteristics of said subdivisions such that the same include internal bracing and a cover of sheet material the sheet portions of which have non-water-tight joinings to minimize structural dangers due to too great rigidity of the subdivision as a whole while the airplane is in air flight, and (*b*) a flotation means stored in at least one of said subdivisions and housed within its cover—said flotation means including a mass of material which is water-absorbent only to an inappreciable degree, which is of less weight than water volume for volume, and which is continuously present in such quantity that when spaces within said cover and unoccupied by said mass of material and such other materials and objects as are within said cover are flooded with water instead of air, due to the inpouring and inseeping of such water through such joinings incident to a partial submergence of said subdivision, the buoyancy nevertheless retained by such subdivision, together with the buoyancies maintained in the same emergency by other subdivisions of the airplane, will insure against complete submergence of the airplane as a whole for a prolonged period; said other subdivisions including wing subdivisions both rockably mounted on an airfoil subdivision therebetween to permit downward rocking of said wing subdivisions, having water-floatable portions beyond such mountings, and being of such lengths that when thus downwardly rocked to lower their said water-floatable portions the airplane is so protected against such destructive water-rockings by rough weather waves as will insure floatability of the airplane as a whole for a prolonged period.

8. In an airplane, the combination with a central structure and wings on opposite sides thereof, all three such structures being of the hollow internally-braced type, of a cover or sheathing for the upper surfaces of said three structures including main spaced sheets, said wings having portions thereof equipped with means to maintain said portions of less weight than volumes of water equal in bulk to said portions, and means for mounting said wings droopably on the central structure so as in an emergency to lower said wing portions, said mounting means being below the spaces between said sheets, and there being an auxiliary fore-and-aft-running strip secured over one of said spaces so as to be strippable therefrom in an emergency.

9. In an airplane, the combination with a central structure and wing structures on opposite sides thereof, all such structures being of the hollow internally-braced type, of a cover or sheathing for the upper surfaces of said structures including main spaced sheets, said wing structures having portions thereof equipped with means to maintain said portions of less weight than volumes of water equal in bulk to said portions, means for pivoting said wing structures droopably on the central structure so as in an emergency to lower said wing portions, and mounting means for each wing structure including spar-structures running athwart the airplane from near the inner to near the outer end of said wing structure, so as normally to render the pivoting means inoperable to droopably mount said wing structures, certain of said spar-structures being located for convenient breakdown by hand-tools to render said wing structures droopable in an emergency.

10. In an airplane, the combination with a central structure and wing structures on opposite sides thereof, all such structures being of the hollow internally-braced type, of a cover or sheathing for the upper surfaces of said structures including main spaced sheets, said wing structures having portions thereof equipped with means to maintain said portions of less weight than volumes of water equal in bulk to said portions, and means for mounting said wing structures droopably on the central structure so as in an emergency to lower said wing portions; the mounting means for each wing structure including a spar-structure running athwart the airplane from near the inner to near the outer end of said wing structure, so as normally to render said mounting means inoperable to droopably mount said wing structure; and auxiliary cover strips running fore and aft and secured over two of said main sheets; certain of said spar-structures, as soon as said strips are ripped away from said sheets, being made more accessible from the exteriors of the wing-structures for breakdown by hand-tools, thereby to render said wing-structures droopable in an emergency.

11. In an airplane, the combination with a central structure and wing structures on opposite sides thereof, all such structures being of the hollow internally-braced type, of a cover or sheathing for the upper surfaces of said structures including main spaced sheets, said wing structures having portions thereof equipped with means to maintain said portions of less weight than volumes of water equal in bulk to said portions, and means for mounting said wing structures droopably on the central structure so as in an emergency to lower said wing portions abnormally close to the water; the mounting means for each wing structure including spar-structures running athwart the airplane from near the inner to near the outer end of said structure and having sections normally permanently secured in place and together to render said mounting means inoperable to droopably mount said wing structures; certain of said spar-structures being located for convenient breakdown; there being still other spar-structures forming parts of the internal bracing of said wing structures, these last-mentioned spar-structures being pivoted together at proper points to permit dead-weight drooping of the wing structures on breakdown of the first-mentioned spar-structures.

12. In an airplane of the type having an air-attacking component, such component of the hollow internally-braced type affording interior spaces adaptable for carrying equipment, the combination of a covering for said component, said covering including a plurality of metal sections directly mounted on said internal bracing and non-rigidly joined to each other to allow relative movement of said sections sufficient to avoid reducing the structural safety factor of said component when the airplane is in flight, the non-rigid joinings of said sections being leak-liable in water incident to their structural character to avoid too great rigidity of said component, and means to insure long-continued floatability of said airplane on water, regardless of said leak-liable joinings, said means including buoyant material in certain of said interior spaces, said buoyant material including cork in part and kapok in part, said kapok including a fire resistant and water resistant outer covering.

13. In an airplane including a fuselage component and an air-attacking component at each side of said fuselage, said air-attacking components being of the internally-braced type to provide interior equipment carrying spaces, said fuselage being adapted to float as a ship when said airplane alights on water, the combination of masses of water-floatable material in one of said components, an engine intermediate the wing tips of the airplane, mounting means for said engine including one of said components, and means for lowering said engine to position the same abnormally close to the center of buoyancy of said airplane when afloat on the water, whereby the engine then improves the metacenter of said airplane and cooperates with said masses of water-floatable material to increase the safe floatability of the airplane when on the water.

14. In an airplane including a fuselage component and a pair of wing components at opposite sides thereof, said wing components being of the internally-braced type to provide interior equipment-carrying spaces, said fuselage being adapted to float as a ship when said airplane alights on water, the combination of masses of water-floatable material in one of said wing components, an engine located at a point considerably forward of midway of the length of the fuselage component, mounting means for said engine, and means to permit lowering of said engine without disturbing same or said mounting means, for then positioning said engine at a predetermined level below that, relative to the bottom of said fuselage component, whereat said engine is positioned during air-flight, whereby the thus lowered engine improves the metacenter of said airplane when afloat on the water, while also adapted to cooperate with said masses of water-floatable material to increase the safe floatability of the airplane when on the water.

15. In an airplane of the type having an air-attacking component, such component of the hollow internally-braced and leak-liable type yet providing interior spaces adaptable for carrying equipment, the combination with said component of the following instrumentalities for mutually cumulative action in preventing partial water-submergence of said component from causing the airplane as a whole to become so water-logged as to sink, to wit (*a*) a mass of buoyant material carried within said component, said material being adapted to remain buoyant after crushing and deformation, (*b*) a fuel tank carried by said component, and (*c*) means operable, when the airplane is afloat on the water, for detaching said tank and dropping the same free of the airplane for jettison purposes, to increase the floatability of said component despite possible water-logging thereof at certain portions.

16. In an airplane including a fuselage and a wing at each side of the fuselage, said wings being of the internally-braced type to provide interior equipment-carrying spaces, said fuselage being adapted to float as a ship when said airplane alights on water, the combination of masses of water-floatable material within certain of said spaces in said fuselage, an engine on the airplane, and releasable mounting means for said engine to permit lowering of the same below its normal air-flight position on the airplane, when the airplane is afloat on the water, whereby said engine then lowers the metacenter of the airplane while also cooperating with said mass of water-floatable material to increase the safe floatability of the airplane on the water.

17. In an airplane having air-attacking components of the internally-braced type to provide interior equipment-carrying spaces, the combination of masses of water-floatable material within said spaces to cause the airplane to float as a ship when it alights on the water, an engine located for air flight on the airplane at a point considerably forward thereon, airplane carried parts including said one of said components for lowering said engine when the airplane is afloat on the water, and means for then holding said engine at a predetermined depth below its air-flight position on the airplane and at an intermediate point on the airplane both longitudinally and laterally thereof, whereby the thus lowered engine favorably changes the metacenter of said airplane when afloat on the water, while also adapted to cooperate with said masses of water-floatable material to increase the safe floatability of the airplane on the water.

18. In an airplane of the type having an air-attacking component, such component of the hollow, internally-braced type affording interior spaces adaptable for carrying equipment, the combination of a covering for said component, said covering including a plurality of sheet material sections directly mounted on said internal bracing and non-rigidly joined to each other to allow relative movement of said sections sufficient to avoid reducing the structural safety factor of said component when the airplane is in flight, the non-rigid joinings of said sections being leak-liable in water incident to their structural character to avoid too great rigidity of said component, and means to insure long-continued floatability of said airplane on water, regardless of said leak-liable joinings, said means including buoyant material in certain of said interior spaces, said buoyant material including an outer casing formed of a material normally water absorbent and fire resistant, said outer casing being treated to resist water absorption.

19. In an airplane of the type having an air-attacking component, such component of the hollow, internally-braced type affording interior spaces adaptable for carrying equipment, the combination of a covering for said component, said covering including a plurality of metal sections held in place by securement to said internal bracing and having non-rigid joinings one to another to minimize structural dangers due to too great rigidity of said component, and to allow relative movement of said sections sufficient to avoid reducing the structural safety factor of said component when said airplane is in flight, the non-rigid joinings of said sections being of such structural character that the same are leak-liable in water, and means to insure long-continued floatability of said airplane on water, regardless of said leak-liable joinings, said means including a filling of buoyant material predeterminedly arranged relative to said internal bracing in certain of said interior spaces and in fluid-accessible relation to the exterior through said leak-liable joinings; there also being means to protect said buoyant material against external ignition, and means to protect the means last mentioned from taking on dead weight due to water absorption.

20. In an air plane of the type having an air-attacking component, such component of the hollow, internally-braced type affording interior spaces adaptable for carrying equipment, the combination of a covering for said component, said covering including a plurality of metal sections held in place by securement to said internal bracing and having non-rigid joinings one to another to minimize structural dangers due to too great rigidity of said component, and to allow relative movement of said sections sufficient to avoid reducing the structural safety factor of said component when said airplane is in flight, the non-rigid joinings of said sections being of such structural character that the same are leak-liable in water, and means to insure long-continued floatability of said airplane on water, regardless of said leak-liable joinings, said means including a filling of buoyant material predeterminedly arranged relative to said internal bracing in certain of said interior spaces and in fluid-accessible relation to the exterior through said leak-liable joinings; said material including cork in part and kapok in part, said kapok including an external ignition resistant covering and means to prevent said covering from taking on dead weight due to water absorption.

21. In an airplane of the type having an air-attacking component, such component of the hollow, internally-braced type affording interior spaces adaptable for carrying equipment, the combination of a covering for said component, said covering including a plurality of metal sections held in place by securement to said internal bracing and having non-rigid joinings one to another to minimize structural dangers due to too great rigidity of said component, and to allow relative movement of said sections sufficient to avoid reducing the structural safety factor of said component when said airplane is in flight, the non-rigid joinings of said sections being of such structural character that the same are leak-liable in water, and means to insure long-continued floatability of said airplane on water, regardless of said leak-liable joinings, said means including a filling of buoyant material predeterminedly arranged relative to said internal bracing in certain of said interior spaces and in fluid-accessible relation to the exterior through said leak-liable joinings; said buoyant material including kapok and there being means to protect said kapok against external ignition, and means to protect the means last mentioned from taking on dead weight due to water absorption.

22. In an airplane of the type having an air-attacking component, such component of the hollow, internally-braced type affording interior spaces adaptable for carrying equipment, the combination of a covering for said component, said covering including a plurality of metal sections held in place by securement to said internal bracing and having non-rigid joinings one to another to minimize structural dangers due to too great rigidity of said component, and to allow relative movement of said sections sufficient to avoid reducing the structural safety factor of said component when said airplane is in flight, the non-rigid joinings of said sections being of such structural character that the same are leak-liable in water, and means to insure long-continued floatability of said airplane on water, regardless of said leak-liable joinings, said means including a filling of buoyant material predeterminedly arranged relative to said internal bracing in certain of said interior spaces and in fluid-accessible relation to the exterior through said leak-liable joinings; there being an outer casing for said material itself formed of a material normally water absorbent and adapted to protect said buoyant material against external ignition.

23. In an airplane of the type having an air-attacking component, such component of the hollow, internally-braced type affording interior spaces adaptable for carrying equipment, the combination of a covering for said component, said covering including a plurality of metal sections held in place by securement to said internal bracing and having non-rigid joinings one to another to minimize structural dangers due to too great rigidity of said component, and to allow relative movement of said sections sufficient to avoid reducing the structural safety factor of said component when said airplane is in flight, the non-rigid joinings of said sections being of such structural character that the same are leak-liable in water, and means to insure long-continued floatability of said airplane on water, regardless of said leak-liable joinings, said means including a filling of buoyant material predeterminedly arranged relative to said internal bracing in certain of said interior spaces and in fluid-accessible relation to the exterior through said leak-liable joinings; there being outer casings for masses of said buoyant filling material, said casings being adapted to protect said buoyant filling material against external ignition and being treated to protect said casings and said material from taking on dead weight due to water absorption.

24. In an airplane, the combination of a hollow water-leakable component, a mass of buoyant material therein to make said component floatable in water, said material being deformable without so reducing its buoyancy as to render it ineffective to keep said component afloat, a driving engine mounted in air-flight position on said airplane, and means for swinging the engine downwardly while maintaining connection between the engine and an upper part of the airplane, thereby to position said engine below said air-flight position to employ said engine as a metacenter lowerer for the airplane while riding on the water.

25. In an airplane, the combination of a hollow water-leakable component, a mass of buoyant material therein to make said component floatable in water, said material being deformable without so reducing its buoyancy as to render it ineffective to keep said component afloat, a plurality of driving engines mounted on air-flight positions on said airplane, and means for in an emergency lowering such an engine and repositioning the same at a predetermined location at a level closer to the location of the center of buoyancy of the airplane when afloat than the distance between the location last-mentioned and the location of said engine when in air-flight position.

26. An airplane wherein there is a central structure and there are water-leakable wing-portions one on either side of said central structure, wherein masses of buoyant material are contained in said wing-portions to make them floatable in water, said material being deformable without reducing its effectiveness buoyantly to act on said wing-portions when submerged in the water, wherein mounting and structural means for said wing-portions are provided which include spar-structures each running, as to normally rigidly interconnected structural components, unbrokenly through one of said wing-portions, and wherein there are pivoted connections between said wing-portions and said central structure, such pivots being normally inoperative due to said spar-structures, said spar-structures being located for convenient breakdown by hand tools in an emergency, thereby to render said pivots operative.

27. In an airplane, the combination with a central structure and wing structures on opposite sides thereof, all such structures being of the hollow internally-braced type, of a cover or sheathing for the upper surfaces of said structures including spaced sheets, said wing structures having portions thereof equipped with means to maintain said portions of less weight than volumes of water equal in bulk to said portions, and means for pivotally mounting said structures on the central structure so as in an emergency to at least partially submerge said wing portions, said mounting means for each wing structure including an auxiliary strip secured over one of said spaces but strippable therefrom in an emergency.

28. An airplane as in claim 24, wherein provisions are made for subsequently hoisting said engine.

29. An airplane as in claim 24, wherein provisions are made for subsequently raising said engine toward its normal or air-flight position on the airplane.

AUGUSTUS M. HENRY.